US008719948B2

(12) United States Patent  
Havercan

(10) Patent No.: US 8,719,948 B2  
(45) Date of Patent: May 6, 2014

(54) METHOD AND SYSTEM FOR THE STORAGE OF AUTHENTICATION CREDENTIALS

(75) Inventor: Peter Edward Havercan, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1592 days.

(21) Appl. No.: 11/741,814

(22) Filed: Apr. 30, 2007

(65) Prior Publication Data

US 2007/0289001 A1 Dec. 13, 2007

(30) Foreign Application Priority Data

May 20, 2006 (GB) .................................. 0610113.3

(51) Int. Cl.
 *G06F 7/04* (2006.01)
 *G06F 21/10* (2013.01)

(52) U.S. Cl.
 CPC ...................................... *G06F 21/10* (2013.01)
 USPC .............. 726/27; 726/2; 726/3; 726/4; 726/5; 726/6; 709/246; 709/217; 709/220; 709/227; 709/228; 709/229; 709/230; 713/168; 713/169; 713/170; 713/182; 713/183; 713/184; 713/185; 713/186

(58) Field of Classification Search
 CPC ....................................................... G06F 21/10
 USPC .................... 726/2–6, 27; 709/246, 217, 220, 709/227–230; 713/168–170, 182–186
 See application file for complete search history.

(56) References Cited

U.S. PATENT DOCUMENTS

| 6,601,761 | B1* | 8/2003 | Katis | 235/379 |
| 6,606,663 | B1* | 8/2003 | Liao et al. | 709/229 |
| 7,194,554 | B1* | 3/2007 | Short et al. | 709/246 |
| 7,350,075 | B1* | 3/2008 | Eastham | 713/168 |
| 7,523,490 | B2* | 4/2009 | Guo et al. | 726/10 |
| 7,577,132 | B2* | 8/2009 | Katz et al. | 370/352 |
| 2002/0078004 | A1* | 6/2002 | Ambrosini et al. | 707/1 |
| 2002/0087718 | A1* | 7/2002 | Hill et al. | 709/237 |
| 2002/0116648 | A1* | 8/2002 | Tran | 713/202 |
| 2002/0162004 | A1* | 10/2002 | Gunter et al. | 713/182 |

(Continued)

FOREIGN PATENT DOCUMENTS

CN 1391754 A 1/2003

OTHER PUBLICATIONS

Jim Basney et al.,"The MyProxy online credential repository", Feb. 2005, Software-Pratice and Experience, pp. 801-816.*

(Continued)

*Primary Examiner* — Luu Pham  
*Assistant Examiner* — Canh Le  
(74) *Attorney, Agent, or Firm* — Fleit Gibbons Gutman Bongini & Bianco PL; Thomas Grzesik

(57) ABSTRACT

A method, apparatus and computer program product for controlling access to host access credentials required to access a host computer system by a client application is provided. The host access credentials are stored in a restricted access directory. The method comprises authenticating directory access credentials received from a client application. The authenticated client application then requests the host access credentials and a determination as to whether the authenticated client process is authorized to access the requested host access credentials, and, if authorized, these are provided to the client application.

18 Claims, 5 Drawing Sheets

(56) References Cited

U.S. PATENT DOCUMENTS

| | | | |
|---|---|---|---|
| 2003/0005308 A1* | 1/2003 | Rathbun et al. | 713/185 |
| 2003/0110246 A1* | 6/2003 | Byrne et al. | 709/223 |
| 2003/0177364 A1* | 9/2003 | Walsh et al. | 713/182 |
| 2004/0267670 A1* | 12/2004 | Minyailov | 705/51 |
| 2005/0021661 A1* | 1/2005 | Duloutre et al. | 709/217 |
| 2005/0081066 A1* | 4/2005 | Lahdensivu et al. | 713/202 |
| 2005/0198501 A1 | 9/2005 | Andreev et al. | |
| 2006/0092948 A1* | 5/2006 | Katz et al. | 370/395.52 |
| 2006/0168255 A1* | 7/2006 | Katz et al. | 709/229 |
| 2006/0168643 A1* | 7/2006 | Howard et al. | 726/2 |
| 2006/0282678 A1* | 12/2006 | Ali et al. | 713/185 |

OTHER PUBLICATIONS

Jim Basney et al.,"Credential Wallets: A Classification of Credential Repositories Highlight MyProxy", Sep. 2003, pp. 1-20.*

Kurt GutzMann, "Access Control and Session Management in the HTTP Environment", Feb. 2001, IEEE Internet Computing, pp. 26-35.*

Jason Novotny and Steven Tuecke, "An Online credential Repository for the Grid: MyProxy", IEEE, pp. 104-111.*

* cited by examiner

METHOD AND SYSTEM FOR THE STORAGE OF AUTHENTICATION CREDENTIALS

FIELD OF THE INVENTION

The present invention relates to the field of data processing and in particular to a method and system for the storage of authentication credentials.

BACKGROUND OF THE INVENTION

The World Wide Web (WWW) is the Internet's multimedia information retrieval system. In the Web environment, client machines communicate with Web servers using the Hypertext Transfer Protocol (HTTP). The Web servers provide users with access to resources, which may be any type of content that can be stored in a file and presented to a user, such as program files, media files, text, graphics, images, sound, video, etc., as well as to applications such as web services.

Before a server provides the requested access, the client application and/or end-user must be authenticated. This is typically achieved using the HTTP Basic Authentication protocol. If the server system wishes to protect its resources, it may send a challenge to the client system which requires the client application to provide the associated credentials (such as a userid and password). This works well when the client application is a web browser under the control of a real person, as the browser can prompt the person to provide the credentials interactively. But when the client application is a pure software application, such as a web service consumer application, with no attendant person, the client application may need to furnish credentials automatedly, without human intervention. It is possible to store the credentials in a directory, but it is difficult to ensure that the credential data is stored securely, so that it cannot be accessed by unauthorized persons or applications.

The present invention aims to overcome this problem and provide a secure method and system for the storage of authentication credentials accessible by a client program without human intervention.

SUMMARY OF THE INVENTION

According to a first aspect of the invention, there is provided a method of controlling access to host access credentials required to access a host computer system by a client application. The method comprises storing the host access credentials in a restricted access directory, receiving directory access credentials from the client application and authenticating the received directory access credentials. Then, when a request for the host access credentials is received from the authenticated client application, a determination as to whether the authenticated client application is authorised to access the requested host access credentials, and, if authorised, providing the host access credentials to the client application.

In a preferred embodiment of the invention the client's host access credentials are stored in a private field of a Lightweight Directory Access Protocol (LDAP) repository. The client credentials are only given out to an LDAP client whose identity has been authenticated, and determined to have the authority to access the credentials.

LDAP repositories are designed to contain secure data using authentication protocols, and individual fields within the repository can be configured to be protected by Access Control Lists. Thus LDAP contains an ideal infrastructure for containing sensitive data such as credentials. On configuration of the system, an administrator sets up permissions for certain client programs, and/or certain users of a client program, to be allowed access to the credentials required to access a resource on a remote server (e.g. HTTP server). Permitted client programs can then automatically obtain the necessary credentials from the LDAP server, once they have been authenticated by the LDAP server.

A second aspect of the invention provides a data processing apparatus for controlling access to host access credentials required to access a resource on a host computer system by a process running on a client computer system the host access credentials being stored in a restricted access field of a directory. The data processing apparatus comprises a receiving component for receiving messages from the client process; an authentication component for authenticating a client process using directory access credentials received from a client process; and a query component for querying the directory for the requested host access credentials in response to a request for the host access credentials from an authenticated client process, the request identifying a user of the client computer system, for determining whether the user of the authenticated client process is authorised to access the host access credentials stored in the directory, and for providing the host access credentials if the user of the client computer system is determined to be authorised to access the host access credentials.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
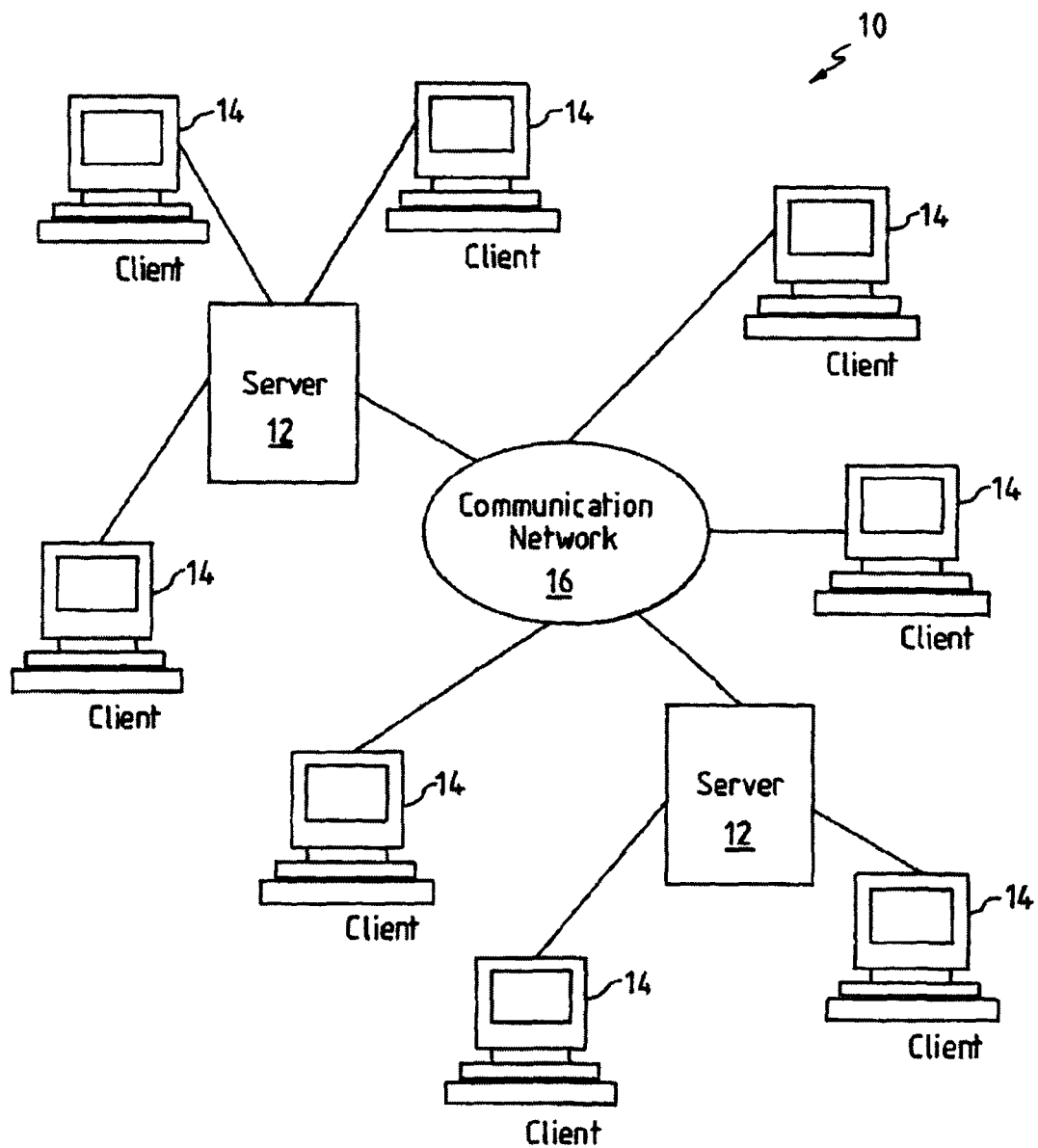
FIG. 1 is a block diagram of a computer network within which the present invention may be implemented.

FIG. 1 shows a conceptual diagram of the well known Internet computer network 10 within which the present invention can be implemented. The Internet 10 is based on a client server model and comprises a plurality of servers 12 which are accessible by a plurality of clients 14 over a communication network 16.

Figure 2:
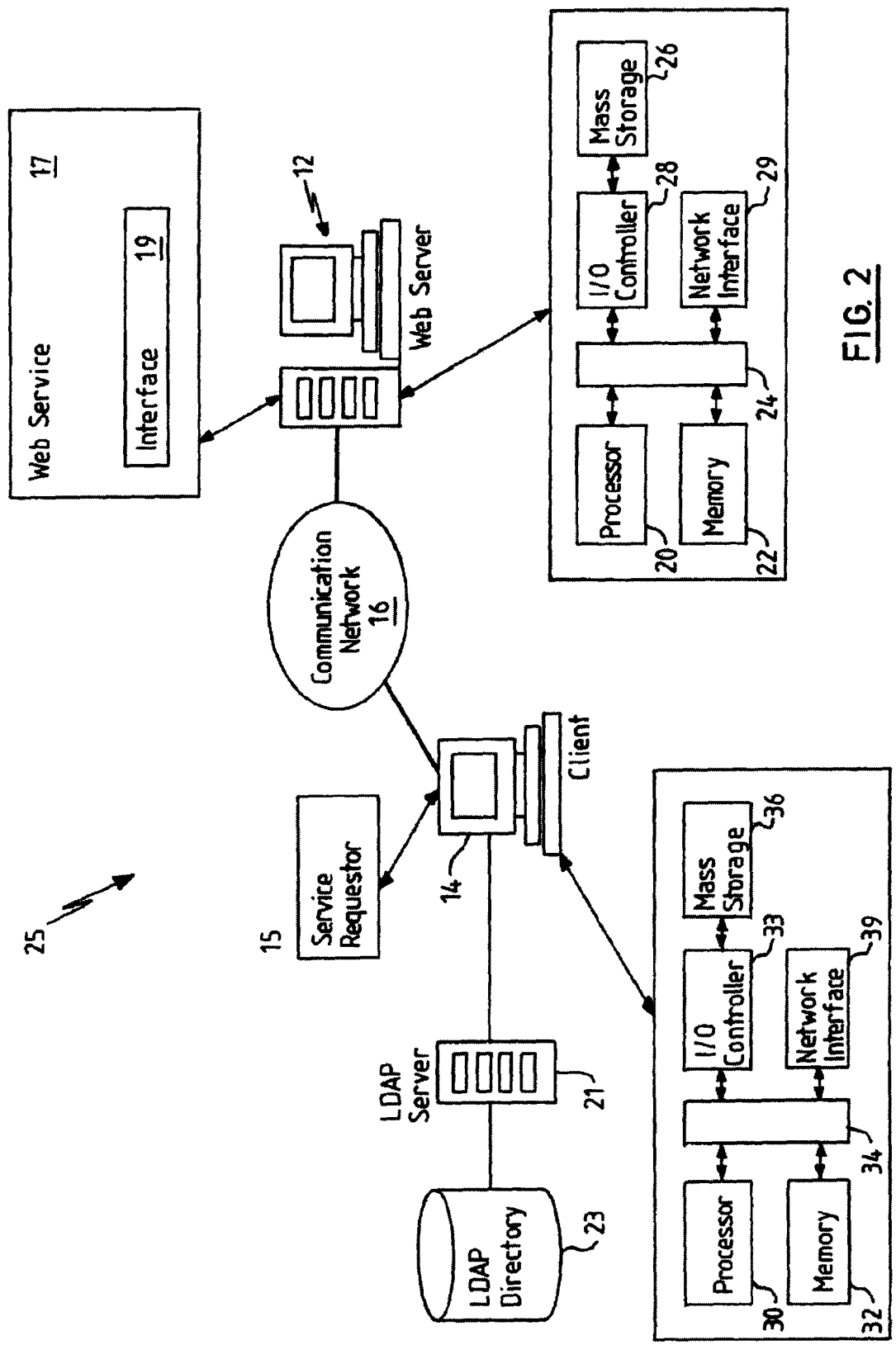
FIG. 2 is a schematic diagram of a computer system comprising host, client and directory server, illustrating the interactions according to a preferred embodiment of the invention.

FIG. 2 shows a computer network 25 comprising a host computer system, Web server 12, connected to client 14 over communication network 16. The hardware components of Web server 12 and client 14 are shown in greater detail. The Web server 12 hosts access to a Web service which provides a collection of functions packaged as a single entity and published to the network for use by other programs, thus supporting interoperable machine-to-machine interaction over the network. The Web service has an interface that is described in a machine-processable format, such as the Web Services Definition Language (WSDL). Other systems interact with the Web service in a manner prescribed by its interface using messages. These messages are typically conveyed using HTTP and normally comprise eXtensible Markup Language (XML) in conjunction with other Web-related standards.

Server 12 includes conventional components such as a processor 20, memory 22 (e.g. RAM), a bus 24 which couples the processor 20 and memory 22, a mass storage device 26 (e.g. a magnetic or optical disk) coupled to the processor 20 and memory 22 through an I/O controller 28 and a network interface 29, such as a conventional modem. Server 12 typically comprises a server computer connected to communication network 16 (e.g. the Internet, an intranet or other network) and on which is installed a web service provider application 40.

Client 14 may be a personal computer or other data processing device which is capable of running a web service consumer application, such as service requestor 15. Service requestor 15 may be a browser driven by a person, but in the preferred embodiment is a program without a user interface, such as another Web service, and which will be referred to as the consumer application. Typically, the web client includes a processor 30, memory 32 (e.g. RAM), a bus 34 which couples the processor 30 and memory 32, a mass storage device 36 (e.g. a magnetic hard disk or an optical storage disk) coupled to the processor 30 and memory through an I/O controller 38 and a network interface 39 (e.g. a conventional modem). Memory 32 supports a number of internet access tools such as the HTTP-compliant consumer application 15.

Client 14 is connected via an LDAP server 21 to an LDAP directory 23. (Although shown as directly connected in FIG. 2, client 14 and LDAP server 21 may be coupled via a communication network).

Figure 4:
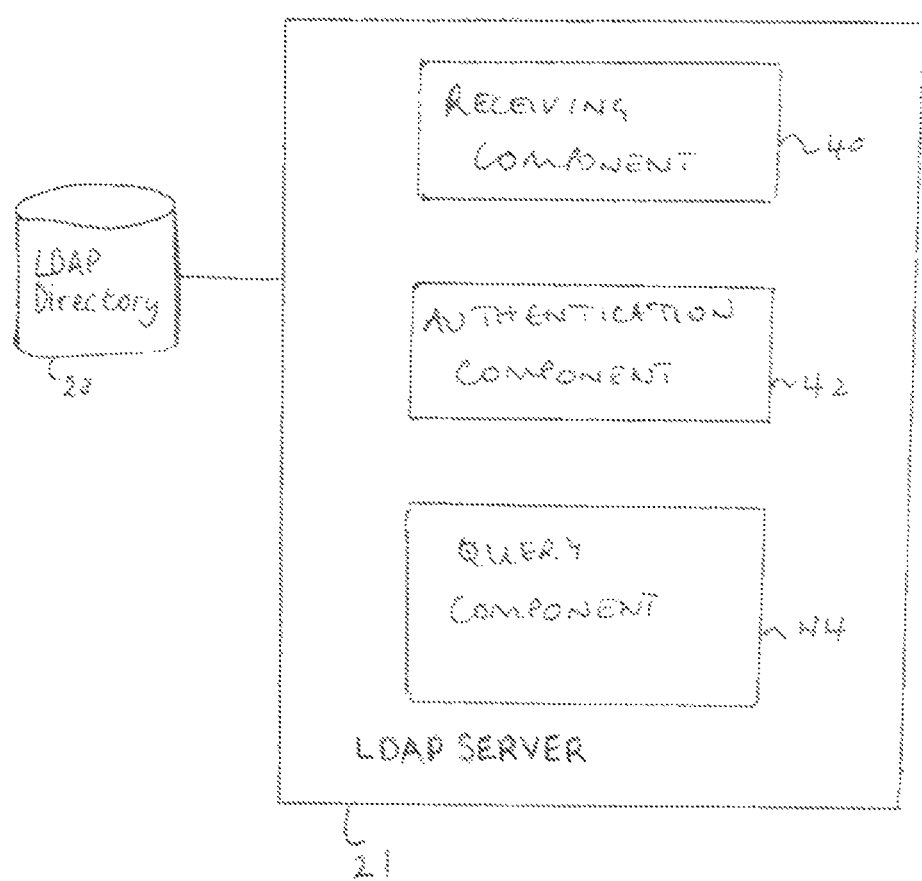
FIG. 4 shows the components of a data processing apparatus suitable for implementing one aspect of the invention.

The LDAP server 21 is a data processing apparatus for controlling access to the fields of the LDAP directory. The LDAP server 21 may comprise a receiving component 40, authentication component 42 and query component 44 as shown in FIG. 4, which are configured so as to carry out the method of the preferred embodiment of the invention.

According to the preferred embodiment of the invention, the credentials that are needed to access the web service 17 on remote HTTP server 12 are stored in secure fields of LDAP repository 17. The data stored in LDAP can be secured and made available only to authenticated users that bind to it with specific LDAP credentials. These are different from the client's host access credentials (e.g. HTTP credentials), which are required to enable the client application to access a resource on the host.

The LDAP directory 23 is a directory in which entries (commonly called objects) are stored in a hierarchical directory structure. LDAP is a networking protocol for querying and modifying directory services running over TCP/IP. Entries are organized in a tree-like structure based on their distinguished name (DN). A DN is a unique name that unambiguously identifies a single entry. DNs are made up of a sequence of relative distinguished names (RDNs). A DN is composed of a sequence of RDNs separated by commas, such as: cn=John Smith, ou=Development, o=IBM, c=GB.

Each object belongs to at least one object class, and can contain attributes, which are stored in the directory and associated with the distinguished name. An object class describes the content and purpose of the object. It also contains a list of attributes, such as a telephone number or surname, which can be defined in an object of that class. Typically, attribute names are mnemonic strings, like "cn" for common name, "c" for country, "o" for organisation, "ou" for organisational unit. The exact hierarchical name structure and the attributes that can be associated with each object are described by a schema language, and the schemas themselves are stored in the repository. Attributes can be assigned security attributes and access control lists, so that certain attributes can only be extracted by authorized individuals or processes. The LDAP protocol contains services for searching the repository and extracting the attributes of the objects meeting the search criteria.

Table 1, below, lists a few of the common schema (object classes and their required attributes). In many cases, an entry can consist of more than one object class.

| Object class | Description | Required attributes |
|---|---|---|
| InetOrgPerson | Defines entries for a person | commonName (cn) surname (sn) objectClass |
| organizationalUnit | Defines entries for organizational units | Ou objectClass |
| Organization | Defines entries for organizations | O objectClass |

Existing published LDAP schemas define the object classes account and simpleAuthObject, with attributes uid and userPassword respectively, and which can be used for LDAP authentication, and also to store HTTP credentials, by defining distinguished name structures containing objects with these attributes.

Another object class that is useful for building a structure for the storage of HTTP credentials is labeledURIobject with attribute labeledURI, which can contain the URL (Uniform Resource Locator) of the target HTTP system.

Figure 3A:
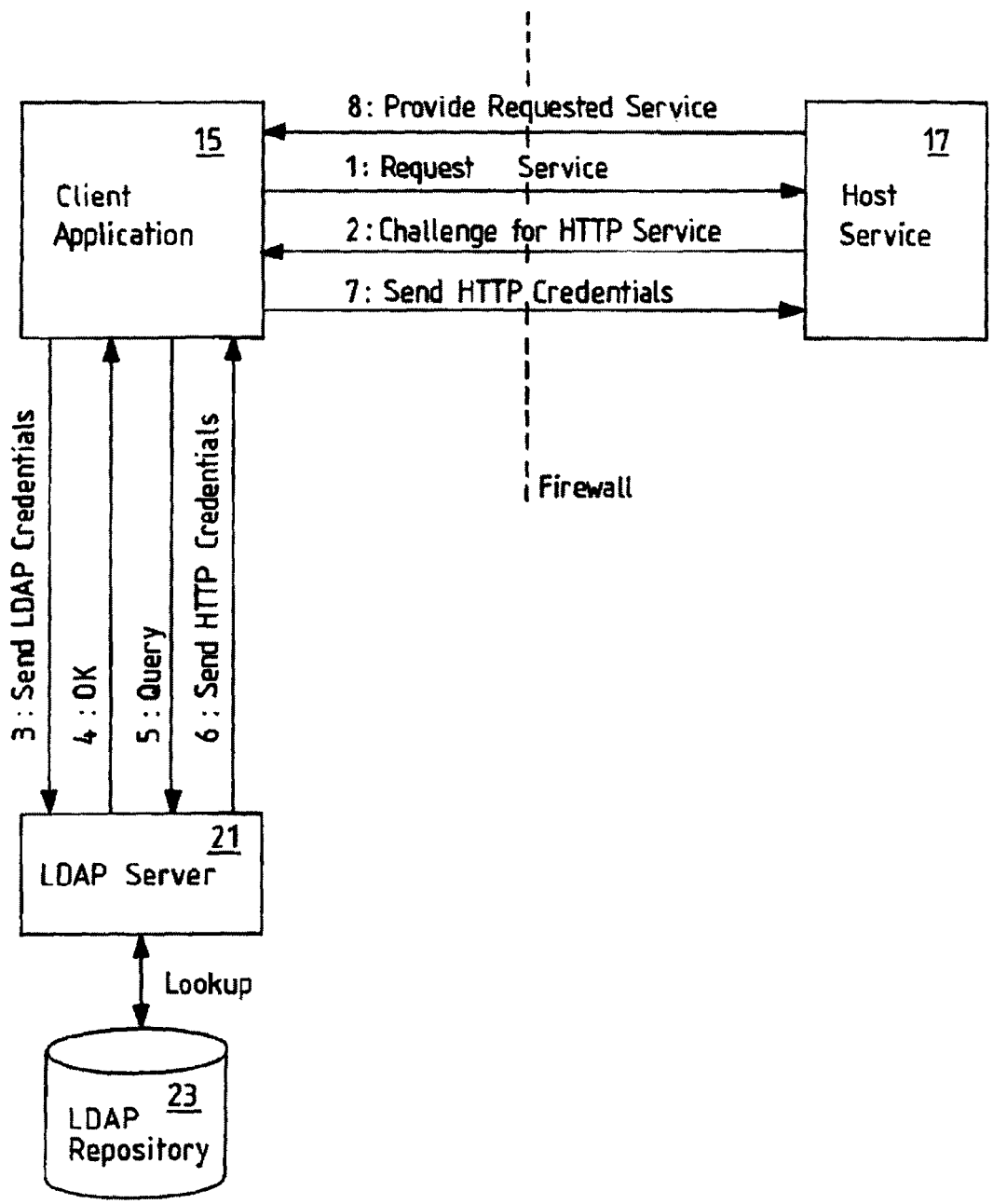
FIG. 3a shows the message flows according to an example embodiment of the invention.
Figure 3B:
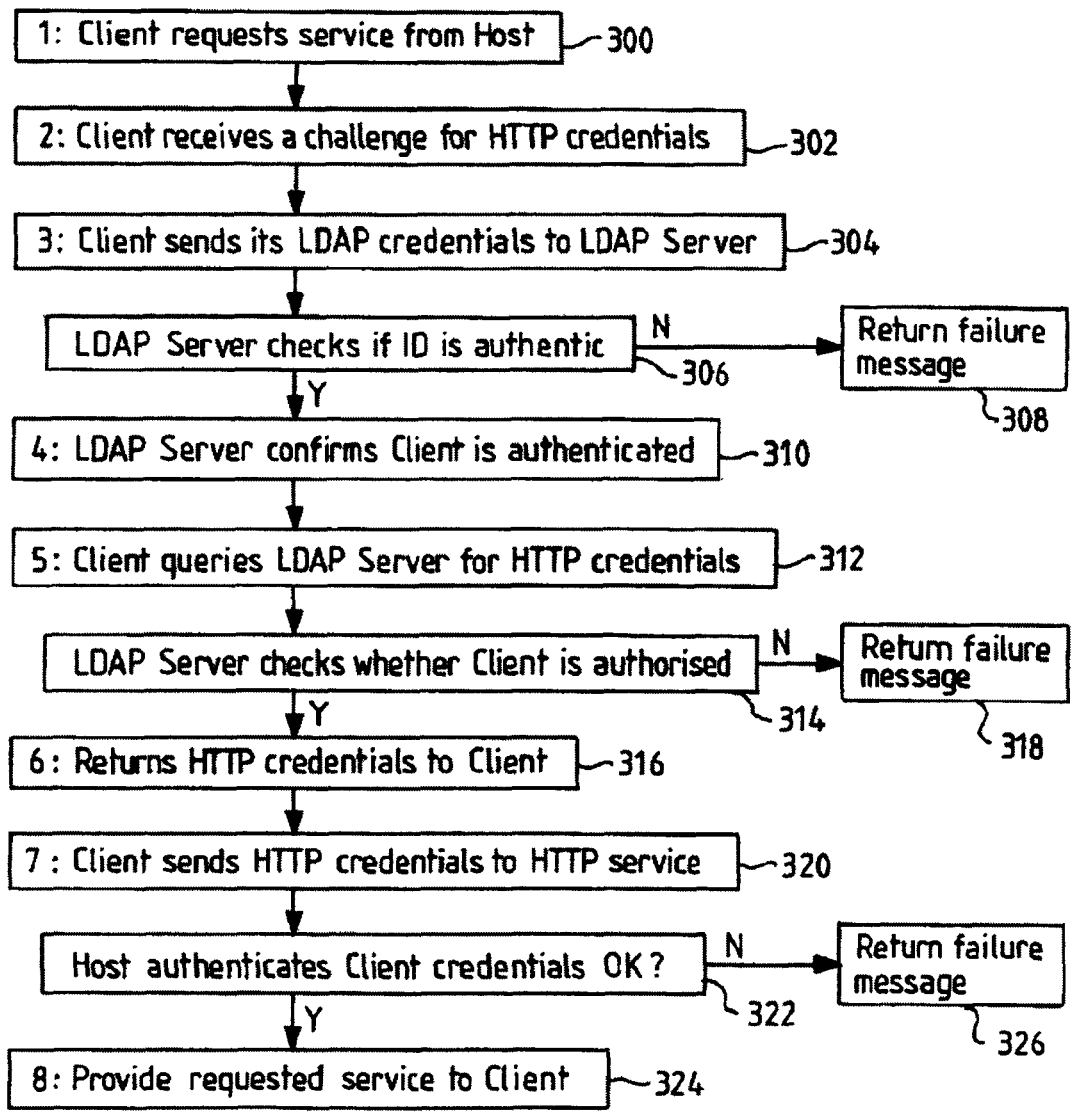
FIG. 3b shows the steps involved in authenticating with an HTTP server, according to one embodiment of the invention.

Referring to FIGS. 3a and 3b, a method of authenticating a service requestor client application 15 with a web service 17 in accordance with a preferred embodiment of the invention will now be described. In the example shown, the service requestor 15 first sends 300 a request [1] to the host service hosted on HTTP server 12, which replies 302 with a challenge [2] as to the client application's HTTP credentials.

The challenge [2] comes in the form of an HTTP 401 error response with an accompanying WWW-Authenticate header. The WWW-Authenticate header contains the name of a security realm, which is a context in which the requested credentials are valid. (In principle, a server may contain several different realms in which different sets of credentials may be valid, and the name of the security realm is a hint to the client as to which credentials are expected.) The client application must then obtain the requested HTTP credentials (userid and password), which are securely stored in the LDAP directory 23.

To obtain access to these, the client application 15 must first establish a session with the LDAP server 21, also known as binding to the LDAP server. The LDAP server listens for traffic at a particular host name/IP address and TCP/IP port number to which the client application addresses its request. The client application identifies itself to the LDAP server by means of message [3] comprising its LDAP credentials, namely a DN and a password, which it sends 304 to the LDAP server. An example of the DN may be: cn=client application. The LDAP server considers the client application authenticated if the DN and password sent by the client application match the password for that DN stored in the directory, that is the LDAP server authenticates the received LDAP credentials by checking the received password against a userPassword attribute in the named object. If these match then the LDAP server sends 306 a communication [4] to the client application indicating that the session has been established. Otherwise a failure message is sent 308.

Once the session has been established the client application can query [5], 312 the LDAP server for the HTTP credentials. These are secured through the use of an Access Control List (ACL), and the LDAP server will check to see whether the authenticated client application is authorised to access the requested fields. An ACL describes the relationship between users of the directory and the objects contained within it, and controls whether the user can read or write an object within the directory. Thus an ACL is used to ensure that only users (applications) who have bound to the LDAP server with known directory access credentials (e.g. LDAP credentials) will be given access to the host access (e.g. HTTP) credentials contained within the LDAP server.

The LDAP credentials used to access the LDAP server are different from the HTTP credentials that are to be extracted from the LDAP server. The LDAP credentials typically consist of the distinguished name of an InetOrgPerson object and an associated password. The HTTP credentials that are extracted from the directory are the uid and userPassword attributes of a simpleAuthObject, that is identified by any of the techniques above.

During system configuration, an LDAP administrator will have defined one or more ACLs that allow an administrator for the HTTP client system to write HTTP credentials into the LDAP directory, and that allow a user (or application) of the HTTP client system to read HTTP credentials from the LDAP directory. These ACLs are defined so that no other users are able to read the HTTP credentials.

If the LDAP server determines 314 that the client application is authorised to access the HTTP credentials these are then returned [6], 316 to the client application. Otherwise a failure message is returned 318.

The client then sends [7], 320 the HTTP credentials to the HTTP server 12 in an HTTP Authorization header. The host server then authenticates 322 the received HTTP credentials and if these are found to be authentic the host server provides [8], 324 the requested service or resource to the client application. Otherwise a failure message 326 is returned.

As shown in FIG. 3*a*, the host server 12 may be positioned behind a firewall for added security. Preferably, the LDAP server is within the same security zone as the client computer system allowing direct access by the client application to the LDAP server.

Typically, the client computer system may be used by any number of users who must first logon to the computer's operating system in order to obtain access to the processes and applications which may be run on the client computer system. The client processes are usually set up under the control of such an authorised user of the client computer system, who may then leave the computer system alone whilst it conducts the required tasks/processes. The directory access credentials provided by the client process may therefore be those of the user of the client computer system, or may be credentials specific to the client process itself.

The repository may contain a plurality of host access credentials which a client process may be authorised to access, and these may each be associated with a different user and/or be for access to different resources. Thus the query from the authenticated client application to the LDAP server may need to include information identifying the particular credentials (e.g. related to which user/service) required. The query takes the form of a DN which names the object containing the required credentials. In the scenario described above with regard to FIGS. 3*a* and 3*b*, where a client system has attempted to connect to an HTTP server and has been challenged to provide credentials associated with a particular realm, a distinguished name of realm=realm-name, labeledURI=target-URL, cn=Basicauth could be used to locate the credentials.

The following other scenarios may apply:

1) when an authenticated client application wants to send unsolicited credentials to a target host server without regard to the security realm at the server or the current identity of the client application, a distinguished name of labeledURI=target-URL, cn=Basicauth could be used to locate the credentials.

2) when an authenticated client application wants to send unsolicited credentials to a target system, but may want to send different credentials based on the current identity of the user executing the client application, a distinguished name of cn=c/ient-identity, labeledURI=target-URL, cn=Basicauth, could be used to locate the credentials.

3) when an authenticated client application has attempted to connect to an HTTP server and has been challenged to provide credentials associated with a particular realm, and the client wants to send credentials based on the current identify of the user executing the client application, a distinguished name of: cn=client-identity, realm=realm-name, labeledURI=target-URL, cn=Basicauth, could be used to locate the credentials.

In all these scenarios, the object in which the required HTTP credentials are stored in the LDAP directory has attributes of uid and userPassword. Once the HTTP client has bound to the LDAP server with appropriate LDAP credentials, it performs an LDAP search operation using one of the above forms of distinguished name, depending on what search parameters it has available. The returned uid and userPassword are then used to compose the required HTTP Authorization header, which is sent with the next HTTP request to the host server.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method, with an information processing system, of controlling access to host access credentials required to access a resource on a host computer system by a client process running on a client computer system, the information processing system being separate and distinct from the host computer system and the client computer system, the method comprising:

storing the host access credentials in a restricted access directory on the information processing system, wherein the host access credentials are separate and distinct from the resource on the host computer system;

receiving directory access credentials from the client process;

authenticating the received directory access credentials to designate an authenticated client process;

receiving, after authenticating the received directory access credentials, a query for the host access credentials from the authenticated client process, the query comprising at least an identity of a user of the client computer system, a security realm identifier that is based on a security realm indication received by the authenticated client process from the host computer system, an address identifier associated with the resource;

performing the query by searching the restricted access directory for the host access credentials using at least the identity of the user, the security realm identifier, and the address identifier;

locating, based on performing the query, the host access credentials;

determining, based on the locating, whether the user of the client computer system is authorized to access the host access credentials stored in the restricted access directory, and based on the user being authorized, the user is only authorized to access the host access credentials, and wherein this authorization is independent of the resource; and based on determining that the user of the client computer system is authorized to access the host access credentials, providing the host access credentials to the authenticated client process, wherein the host access credentials are configured to be provided to the host computer system.

2. The method of claim 1, wherein storing the host access credentials in a restricted access directory comprises:

receiving directory access credentials from a directory administrator;

authenticating the directory administrator based on the directory access credentials;

receiving the host access credentials and an associated access control list from the directory administrator who has been authenticated; and storing the host access credentials in the restricted access directory and the associated access control list.

3. The method of claim 1, wherein determining whether the user of the client computer system is authorized to access the host access credentials comprises comparing the identity of the user to an access control list.

4. The method of claim 3, wherein the access control list defines a list of users authorized to access the host access credentials.

5. The method of claim 1, further comprising receiving a request from the client process for the host access credentials stored on the restricted access directory based on a challenge for the host access credentials from the host computer system.

6. The method of claim 1, wherein the user of the client computer system is the authenticated client process.

7. The method of claim 1, further comprising sending a request to authenticate the client process, the request identifying an entry in a repository and a password.

8. The method of claim 7, wherein authenticating the client process comprises determining whether the received password matches a password stored as an attribute of the identified repository entry.

9. A data processing apparatus for controlling access to host access credentials required to access a resource on a host computer system by a client process running on a client computer system, the data processing apparatus being separate and distinct from the host computer system and the client computer system, wherein the host access credentials are stored in a restricted access field of a directory of the data processing apparatus, the data processing apparatus comprising:

a hardware processor;

a memory communicatively coupled to the hardware processor;

a receiving component, communicatively coupled to the hardware processor and the memory, for receiving messages from the client process;

an authentication component, communicatively coupled to the hardware processor and the memory, for authenticating the client process using directory access credentials received from the client process to designate an authenticated client process; and a query component, communicatively coupled to the hardware processor and the memory, for receiving, after authenticating the received directory access credentials, a query for the host access credentials from the authenticated client process, the query comprising at least an identity of a user of the client computer system, a security realm identifier that is based on a security realm indication received by the authenticated client process from the host computer system, an address identifier associated with the resource;

performing the query by searching the restricted access directory for the host access credentials using at least the identity of the user, the security realm identifier, and the address identifier;

locating, based on performing the query, the host access credentials;

determining, based on the locating, whether the user of the authenticated client process is authorized to access the host access credentials stored in the restricted access directory, and based on the user being authorized, the user is only authorized to access the host access credentials, and wherein this authorization is independent of the resource; and based on determining that the user of the client computer system is authorized to access the host access credentials, providing the host access credentials to the authenticated client process, wherein the host access credentials are configured to be provided to the host computer system.

10. The data processing apparatus according to claim 9, wherein the receiving component is further for receiving directory access credentials from a directory administrator, wherein the authentication component is further for authenticating the received directory administrator credentials,
wherein the receiving component is further for receiving, based on authenticating the received directory administrator credentials, host access credentials and an associated access control list from the directory administrator and storing the host access credentials in the directory, along with the associated access control list.

11. A computer program product having a set of instructions, embodied in a non-transitory computer readable storage medium, to cause a computer to perform a method of controlling access to host access credentials required to access a resource on a host computer system by a client process running on a client computer system, the computer being separate and distinct from the host computer system and the client computer system, the method comprising:
storing the host access credentials in a restricted access directory on the computer, wherein the host access credentials are separate and distinct from the resource on the host computer system;
receiving directory access credentials from the client process;
authenticating the received directory access credentials to designate an authenticated client process;
receiving, after authenticating the received directory access credentials, a query for the host access credentials from the authenticated client process, the query comprising at least an identity of a user of the client computer system, a security realm identifier that is based on a security realm indication received by the authenticated client process from the host computer system, an address identifier associated with the resource;
performing the query by searching the restricted access directory for the host access credentials using at least the identity of the user, the security realm identifier, and the address identifier;
locating, based on performing the query, the host access credentials;
determining, based on the locating, whether the user of the client computer system is authorized to access the host access credentials stored in the restricted access directory, and based on the user being authorized, the user is only authorized to access the host access credentials, and wherein this authorization is independent of the resource; and
based on determining that the user of the client computer system is authorized to access the host access credentials, providing the host access credentials to the authenticated client process, wherein the host access credentials are configured to be provided to the host computer system.

12. The computer program product of claim 11, wherein determining whether the user of the client computer system is authorized to access the host access credentials comprises comparing the identity of the user to an access control list.

13. The computer program product of claim 11, wherein storing the host access credentials in a restricted access directory comprises:
receiving directory access credentials from a directory administrator;
authenticating the directory administrator based on the directory access credentials;
receiving the host access credentials and an associated access control list from the directory administrator who has been authenticated; and
storing the host access credentials in the restricted access directory and the associated access control list.

14. The computer program product of claim 13, wherein the access control list defines a list of users authorized to access the host access credentials.

15. The computer program product of claim 11, further comprising instructions for receiving a request from the client process for the host access credentials stored on the restricted access directory based on a challenge for the host access credentials from the host computer system.

16. The computer program product of claim 11, wherein the user of the client computer system is the authenticated client process.

17. The computer program product of claim 11, further comprising instructions for sending a request to authenticate the client process, the request identifying an entry in a repository and a password.

18. The computer program product of claim 17, wherein authenticating the client process comprises:
determining whether the received password matches a password stored as an attribute of the identified repository entry.

* * * * *